United States Patent
Wang et al.

(10) Patent No.: US 10,237,750 B2
(45) Date of Patent: *Mar. 19, 2019

(54) METHOD AND APPARATUS FOR TRANSMITTING PATTERN INFORMATION

(71) Applicant: HUAWEI TECHNOLOGIES CO., LTD., Shenzhen, Guangdong (CN)

(72) Inventors: Jun Wang, Shanghai (CN); Guohua Zhou, Shanghai (CN); Tianle Deng, Shanghai (CN); Xiaoqian Jia, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/825,564

(22) Filed: Nov. 29, 2017

(65) Prior Publication Data
US 2018/0084433 A1 Mar. 22, 2018

Related U.S. Application Data

(63) Continuation of application No. 15/269,707, filed on Sep. 19, 2016, now Pat. No. 9,860,756, which is a (Continued)

(51) Int. Cl.
H04W 72/00 (2009.01)
H04W 16/14 (2009.01)
(Continued)

(52) U.S. Cl.
CPC ........... *H04W 16/14* (2013.01); *H04L 5/0048* (2013.01); *H04W 24/02* (2013.01); *H04W 24/08* (2013.01);
(Continued)

(58) Field of Classification Search
CPC . H04W 72/0446; H04W 16/14; H04W 24/02; H04W 24/08; H04W 88/04; H04L 5/0048
(Continued)

(56) References Cited

U.S. PATENT DOCUMENTS 8,811,321 B2    8/2014  Koo et al.
9,491,662 B2 *  11/2016 Ericson ................ H04W 16/14
(Continued)

FOREIGN PATENT DOCUMENTS

CN    102232323 A    11/2011
CN    102595596 A     7/2012
(Continued)

OTHER PUBLICATIONS

3GPP TS 25.433 V12.0.0 3rd Generation Partnership Project; Technical Specification Group Radio Access Network; UTRAN Iub interface Node B Application Part (NBAP) signalling (Release 12), Dec. 2013, Technical Specification, 1348 pages.
(Continued)

*Primary Examiner* — Huy C Ho
(74) *Attorney, Agent, or Firm* — Fish & Richardson P.C.

(57) ABSTRACT

Embodiments of the present disclosure provide example methods and apparatuses for transmitting pattern information. One example method for transmitting pattern information includes obtaining pattern information and sending the pattern information to UE. The first pattern information indicates that the spectrum of the first cell is allocated to the first RAT in a first plurality of sub-frames and that the spectrum of the first cell is allocated to the second RAT in a second plurality of sub-frames. The first pattern information enables at least one of the UE to select any sub-frame in the first plurality of sub-frames to measure a CRS if the UE RAT pattern corresponds to the first RAT or the UE to select any sub-frame in the second plurality of sub-frames to
(Continued)

measure the CRS if the UE RAT pattern corresponds to the second RAT.

15 Claims, 6 Drawing Sheets

Related U.S. Application Data continuation of application No. PCT/CN2014/073737, filed on Mar. 20, 2014.

(51) Int. Cl.
*H04L 5/00* (2006.01)
*H04W 24/02* (2009.01)
*H04W 24/08* (2009.01)
*H04W 72/04* (2009.01)
*H04W 88/04* (2009.01)

(52) U.S. Cl.
CPC ........ *H04W 72/0446* (2013.01); *H04W 88/04* (2013.01)

(58) Field of Classification Search
USPC .............................................. 455/435.1, 450
See application file for complete search history.

(56) References Cited

U.S. PATENT DOCUMENTS

| 2010/0135272 | A1 | 6/2010 | Dayal et al. |
| 2012/0108238 | A1 | 5/2012 | Kim et al. |
| 2012/0188877 | A1 | 7/2012 | Chin et al. |
| 2013/0142151 | A1 | 6/2013 | Yuk et al. |
| 2013/0279376 | A1 | 10/2013 | Ahmadi et al. |
| 2013/0308595 | A1 | 11/2013 | Ratasuk et al. |
| 2014/0016598 | A1 | 1/2014 | Kwon et al. |
| 2014/0023013 | A1 | 1/2014 | Lee et al. |
| 2014/0133420 | A1 | 5/2014 | Oizumi et al. |
| 2015/0057003 | A1 | 2/2015 | Dwyer et al. |
| 2016/0308636 | A1 | 10/2016 | Deng et al. |
| 2016/0309494 | A1 | 10/2016 | Kadous et al. |

FOREIGN PATENT DOCUMENTS

| CN | 102624466 A | 8/2012 |
| CN | 102917434 A | 2/2013 |
| CN | 103120012 A | 5/2013 |
| CN | 103477684 A | 12/2013 |
| CN | 103563436 A | 2/2014 |
| KR | 20120013424 A | 2/2012 |
| WO | 2013100826 A1 | 7/2013 |

OTHER PUBLICATIONS

3GPP TS 36.423 V12.1.0 3rd Generation Partnership Project; Technical Specification Group Radio Access Network; Evolved Universal Terrestrial Radio Access Network (E-UTRAN); X2 application protocol (X2AP)(Release 12), Mar. 2014, Technical Specification, 144 pages.

Extended European Search Report in European Application No. 14886364, dated Feb. 14, 2017, 8 pages.

International Search Report in International Application No. PCT/CN2014/073737, dated Dec. 31, 2014, 4 pages.

Chinese Office Action issued in Chinese Application No. 201480000697.0 dated Aug. 21, 2018, 7 pages.

Indian Office Action issued in Indian Application No. 201617032014 dated Jan. 23, 2019, 7 pages.

* cited by examiner

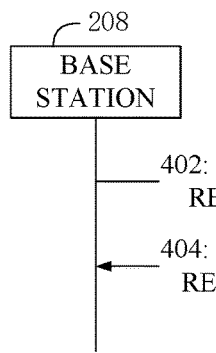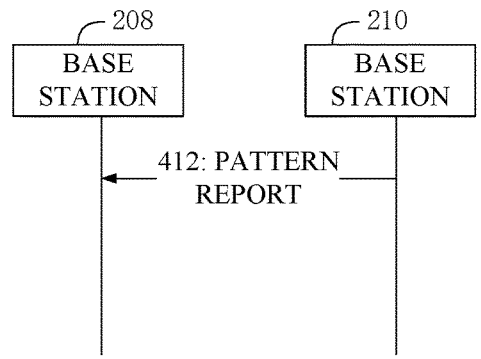
FIG. 4A                FIG. 4B
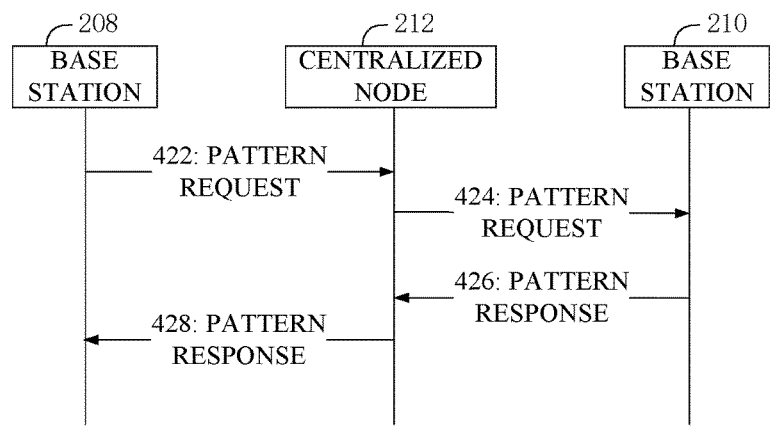
FIG. 4C
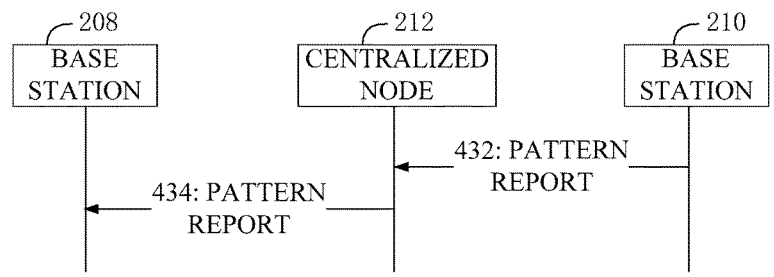
FIG. 4D

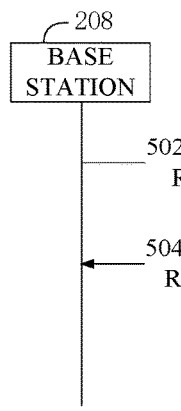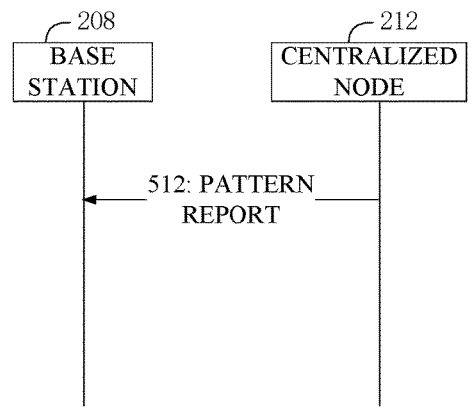
FIG. 5A  FIG. 5B
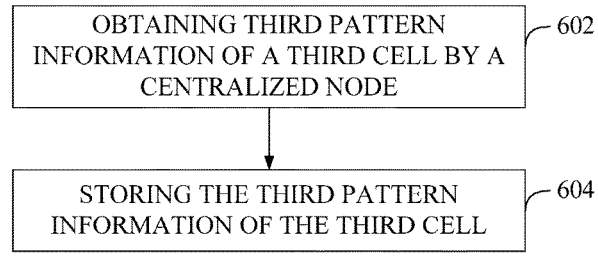
FIG. 6
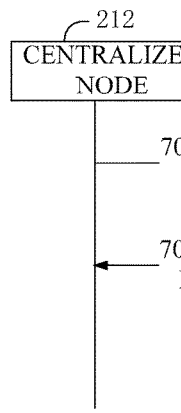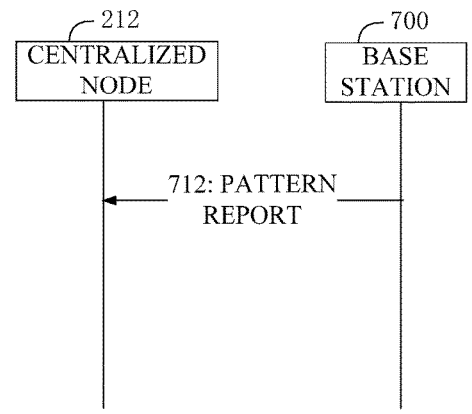
FIG. 7A  FIG. 7B

METHOD AND APPARATUS FOR TRANSMITTING PATTERN INFORMATION

CROSS-REFERENCE TO RELATED APPLICATIONS

This application is a continuation of U.S. patent application Ser. No. 15/269,707, filed on Sep. 19, 2016, which is a continuation of International Application No. PCT/CN2014/073737, filed on Mar. 20, 2014, All of the afore-mentioned patent applications are hereby incorporated by reference in their entireties.

TECHNICAL FIELD

Embodiments of the present invention relate to the field of communications technologies, and in particular, to a method and an apparatus for transmitting pattern information.

BACKGROUND

At present, restricted by the fact that radio access technology (RAT) replacement from Universal Mobile Telecommunications System (UMTS) RAT to Long Term Evolution (LTE) RAT is a long-term project, the operators cannot stop UMTS RAT's network immediately, and LTE RAT will coexist with UMTS RAT for a period of time. Thus, a time-division spectrum allocation solution, such as dynamic spectrum sharing method or semi-dynamic spectrum sharing method, is utilized to switch the spectrum of a cell between LTE RAT and UMTS RAT alternately accordingly to a certain parameter. For example, in the semi-dynamic spectrum sharing method, the spectrum is released from UMTS RAT and allocated to LTE RAT when UMTS RAT is supposed to have a low traffic; and the spectrum is released from LTE RAT and allocated to UMTS RAT when UMTS RAT is supposed to have a high traffic. In the dynamic spectrum sharing method, the spectrum is allocated according to a load of UMTS in a transmission time interval (TTI). For example, the spectrum can be allocated to LTE RAT when UMTS RAT is supposed to have a low load and be allocated to UMTS RAT when UMTS RAT is supposed to have a high load.

FIG. 1 illustrates a prior art system in which spectrum of a cell is allocated to a LTE RAT and a UMTS RAT alternately in a time-division manner. Suppose a user equipment (UE) operates in LTE pattern, and the spectrum of primary-serving cell is allocated to LTE RAT initially. The UE measures a downlink cell reference signal (CRS) and feedbacks the measurement result to the primary-serving cell via uplink channel periodically. However, in a time-division spectrum sharing situation, the spectrum of primary-serving cell is allocated to UMTS RAT with a same frequency-band from t2 to t3, for example. In this case, the measurement result of CRS in any time slot from t2 to t3 is wrong, and wrong measurement result is feedback to the primary-serving cell by UE. Therefore, accuracy and efficiency of downlink scheduling are reduced.

SUMMARY

Embodiments of the present invention provide a method and an apparatus for transmitting pattern information.

According to a first aspect, a method for transmitting pattern information is provided, the method comprising:

obtaining, by a first base station, pattern information comprising first pattern information of a first cell, the first cell belongs to the first base station, wherein spectrum of the first cell is allocated to a first radio access technology (RAT) and a second RAT in different sub-frames, wherein the first pattern information indicates that the spectrum of the first cell is allocated to the first RAT in a first plurality of sub-frames, and that the spectrum of the first cell is allocated to the second RAT in a second plurality of sub-frames; and sending, by the first base station, the pattern information to a user equipment (UE), wherein the first pattern information is configured to enable the UE to select any sub-frame in the first plurality of sub-frames to measure a downlink cell reference signal (CRS) sent by the first base station if a RAT pattern of the UE corresponds to the first RAT, or to enable the UE to select any sub-frame in the second plurality of sub-frames to measure the downlink CRS sent by the first base station if the RAT pattern of the UE corresponds to the second RAT.

According to a second aspect, a method for transmitting pattern information is provided, the method comprising:

receiving, by a user equipment (UE), pattern information comprising first pattern information of a first cell, the first cell belongs to a first base station, wherein spectrum of the first cell is allocated to a first radio access technology (RAT) and a second RAT in different sub-frames, wherein the first pattern information indicates that spectrum of the first cell is allocated to the first RAT in a first plurality of sub-frames, and that spectrum of the first cell is allocated to the second RAT in a second plurality of sub-frames; and selecting any sub-frame in the first plurality of sub-frames to measure a downlink cell reference signal (CRS) sent by the first base station if a RAT pattern of the UE corresponds to the first RAT, or selecting any sub-frame in the second plurality of sub-frames to measure the downlink CRS sent by the first base station if the RAT pattern of the UE corresponds to the second RAT.

According to a third aspect, an apparatus for transmitting pattern information is provided, the apparatus comprising:

an obtaining unit, configured to obtain pattern information comprising first pattern information of a primary-serving cell, wherein spectrum of the primary-serving cell is allocated to a first radio access technology (RAT) and a second RAT in different sub-frames, wherein the first pattern information indicates that the spectrum of the primary-serving cell is allocated to the first RAT in a first plurality of sub-frames, and that the spectrum of the primary-serving cell is allocated to the second RAT in a second plurality of sub-frames;

a first sending unit, configured to send a first downlink cell reference signal (CRS); and a second sending unit, coupled to the obtaining unit and configured to send the pattern information to a user equipment (UE), wherein the first pattern information is configured to enable the UE to select any sub-frame in the first plurality of sub-frames to measure the first downlink CRS if a RAT pattern of the UE corresponds to the first RAT, or to enable the UE to select any sub-frame in the second plurality of sub-frames to measure the first downlink CRS if the RAT pattern of the UE corresponds to the second RAT.

According to a fourth aspect, an apparatus for transmitting pattern information is provided, the apparatus comprising:

a receiving unit, configured to receive pattern information comprising first pattern information of a primary-serving cell, the primary-serving cell belongs to a first base station, wherein spectrum of the primary-serving cell is allocated to a first radio access technology (RAT) and a second RAT in different sub-frames, wherein the first pattern information indicates that spectrum of the primary-serving cell is allocated to the first RAT in a first plurality of sub-frames, and that spectrum of the primary-serving cell is allocated to the second RAT in a second plurality of sub-frames; and a selecting unit, coupled to the receiving unit and configured to select any sub-frame in the first plurality of sub-frames to measure a downlink cell reference signal (CRS) sent by the first base station if a RAT pattern of the UE corresponds to the first RAT; or to select any sub-frame in the second plurality of sub-frames to measure the downlink CRS sent by the first base station if the RAT pattern of the UE corresponds to the second RAT.

According to some of the embodiments of the present invention, the first pattern information sent to the UE enables the UE to select any sub-frame in the first plurality of sub-frames to measure the downlink CRS sent by the first base station if the RAT pattern of UE corresponds to the first RAT, or enables the UE to select any sub-frame in the second plurality of sub-frames to measure the downlink CRS sent by the first base station if the RAT pattern of UE corresponds to the second RAT. Therefore, the UE is able to self-determine when to measure the downlink CRS sent by the first base station. In this way, the measurement result of downlink CRS is correct. Therefore, accuracy and efficiency of scheduling is improved.

BRIEF DESCRIPTION OF DRAWINGS

To illustrate the technical solutions in the embodiments of the present invention more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

FIG. 4A, FIG. 4B, FIG. 4C and FIG. 4D are sequence diagrams that respectively illustrate four examples of interaction between base stations to obtain pattern information of an adjacent cell, according to one embodiment of the present invention;

FIG. 5A and FIG. 5B are sequence diagrams that respectively illustrate two examples of interaction between a base station and a centralized node to obtain pattern information of an adjacent cell, according to one embodiment of the present invention;

FIG. 6 illustrates a flowchart of a method for transmitting pattern information, performed by a centralized node, according to one embodiment of the present invention;

FIG. 7A and FIG. 7B are sequence diagrams that respectively illustrate two examples of interaction between a base station and a centralized node to obtain pattern information of a cell, according to one embodiment of the present invention;

DESCRIPTION OF EMBODIMENTS

The following describes the technical solutions in the embodiments of the present invention with reference to the accompanying drawings in the embodiments of the present invention. It is understood that the described embodiments are merely examples of some of the embodiments of the present invention rather than all of the embodiments of the present invention. All other embodiments obtained by a person of ordinary skill in the art based on the embodiments of the present invention without creative efforts shall fall within the protection scope of the present invention.

Figure 1:
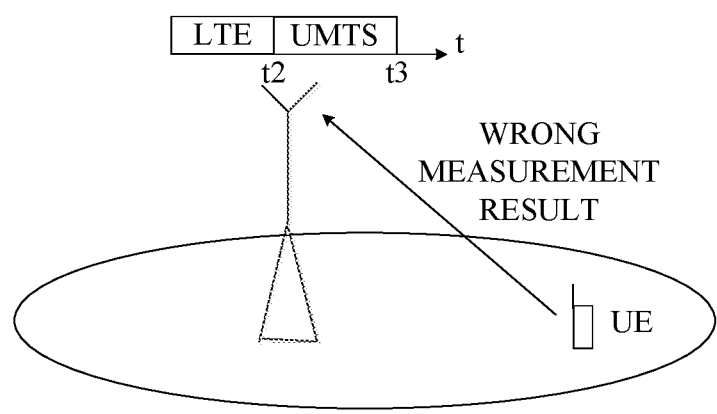
FIG. 1 illustrates a prior art system in which spectrum of a cell is allocated to LTE RAT and UMTS RAT alternately in a time-division manner.
Figure 2:
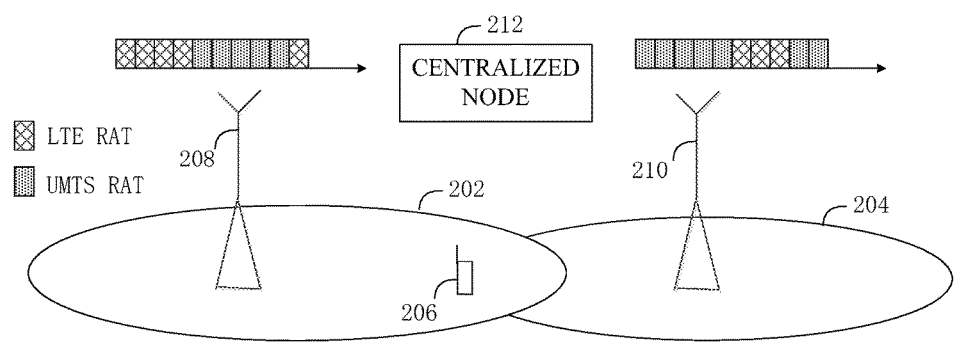
FIG. 2 illustrates a system in which an embodiment of the present invention can be applied.

FIG. 2 illustrates a system in which an embodiment of the present invention can be applied. As illustrated in FIG. 2, a UE 206 is located in a primary-serving cell 202 belonging to a base station 208. The base station 208 sends a downlink CRS to the UE 206. Meanwhile, an adjacent cell 204 belongs to or is associated with a base station 210, and the base station 210 also sends a downlink CRS in a same frequency. As shown in FIG. 2, the adjacent cell 204 is adjacent to the primary-serving cell 202.

In the example of FIG. 2, both the base stations 208 and 210 employ semi-dynamic spectrum sharing. Take one frame as example. In the example in FIG. 2, there are ten sub-frames in one frame. The UMTS RAT in the primary-serving cell 202 may have a low traffic in the sub-frames from the first sub-frame to the fourth sub-frame in one frame, so the base station 208 releases the spectrum from the UMTS RAT and allocates the spectrum to the LTE RAT in the sub-frames from the first sub-frame to the fourth sub-frame based on an algorithm. The UMTS RAT in the primary-serving cell 202 may have a high traffic in the sub-frames from the fifth sub-frame to the ninth sub-frame, so the base station 208 releases the spectrum from the LTE RAT and allocates the spectrum back to the UMTS RAT in the sub-frames from the fifth sub-frame to the ninth sub-frame. Moreover, the UMTS RAT in the primary-serving cell 202 may have a low traffic again in the tenth sub-frame, so the base station 208 releases the spectrum from the LTE RAT and allocates the spectrum back to the UMTS RAT in the tenth sub-frame. In this way, spectrum of the primary-serving cell 202 is allocated to a first RAT and a second RAT alternately, in a time-division manner, that is, spectrum of the primary-serving cell 202 is allocated to a first RAT and a second RAT in different sub-frames. In the example shown in FIG. 2, the first RAT includes a LTE RAT and the second RAT includes a UMTS RAT, however, the first RAT or the second RAT is not so limited. For example, the first RAT and the second RAT can include any two selected from LTE RAT, UMTS RAT, global system for mobile communication (GSM) RAT and wireless local area network (WLAN) RAT. The adjacent cell 204 operates similarly as the primary-serving cell 202, for example, the spectrum of the adjacent cell 204 is allocated to the UMTS RAT in the sub-frames from the first sub-frame to the fifth sub-frame and in the sub-frames from the ninth sub-frame to the tenth sub-frame, and the spectrum of the adjacent cell 204 is allocated to the LTE RAT in the sub-frames from the sixth sub-frame to the eighth sub-frame.

In one embodiment, the spectrum allocated to one specific RAT in a cell, is allocated to different scheduling type in different sub-frames. For example, the scheduling type can be differentiated according to UE's location in the cell. If UE's channel quality indicator (CQI) is equal to or above a CQI limit, or UE's reference signal received power (RSRP) is equal to or above a RSRP limit, or UE's reference signal received quality (RSRQ) is equal to or above a RSRQ limit, the UE is a cell-center UE. If UE's CQI is below the CQI limit or UE's RSRP is below the RSRP limit or UE's RSRQ is below the RSRQ limit, the UE is a cell-edge UE. Specifically, in the example of FIG. 2, the spectrum can be allocated to a LTE cell-edge UE in the primary-serving cell 202 in the sub-frames from the first sub-frame to the second sub-frame, and can be allocated to a LTE cell-center UE in the primary-serving cell 202 in the sub-frames from the third sub-frame to the fourth sub-frame. In another example, the scheduling type can be differentiated according to UE's service type, e.g., the service type includes making phone calls, surfing internet, and watching videos. Specifically, in the example of FIG. 2, the spectrum can be allocated to a UMTS UE that is making phone calls in the primary-serving cell 202 in the sub-frames from the fifth sub-frame to the seventh sub-frame, and can be allocated to a UMTS UE that is watching videos in the primary-serving cell 202 in the sub-frames from the eighth sub-frame to the ninth sub-frame.

In one embodiment, the scenario further includes a centralized node 212. The centralized node includes but not limited to Single RAN Controller (SRC), Network Management Server (NMS), Element Management Server (EMS), and Mobility Management Entity (MME).

However, it should be understood that the following description is not limited to the system illustrated in FIG. 2, for example, embodiments of the present invention also apply to a system in which any of the primary-serving cell and the adjacent cells employs semi-dynamic spectrum sharing, or employs dynamic spectrum sharing to allocate spectrum to UMTS RAT and LTE RAT alternately in a time-division manner according to UMTS RAT's load in a TTI.

Figure 3:
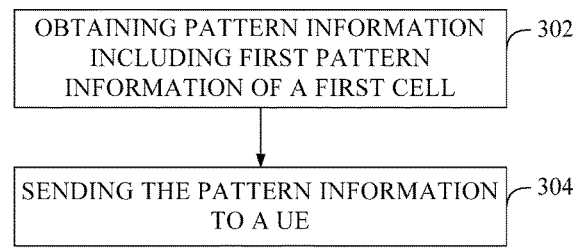
FIG. 3 illustrates a flowchart of a method for transmitting pattern information, performed by a base station, according to one embodiment of the present invention.

FIG. 3 illustrates a flowchart of a method for transmitting pattern information, according to one embodiment of the present invention. The flowchart is performed by a first base station, e.g., the base station 208 in a scenario illustrated in FIG. 2.

In step 302, pattern information is obtained by the first base station. For example, the pattern information is generated by the first base station, or is received from a centralized node.

In one embodiment, the pattern information at least includes first pattern information of a first cell. The first cell belongs to or is associated with the first base station. For example, the first pattern information includes pattern information of the primary-serving cell 202. The first pattern information indicates that spectrum of the first cell is allocated to a first RAT (e.g., UMTS RAT) in a first plurality of sub-frames, and that spectrum of the first cell is allocated to a second RAT (e.g., LTE RAT) in a second plurality of sub-frames. In the example of FIG. 2, the pattern information of the primary-serving cell 202 indicates that spectrum of the primary-serving cell 202 is allocated to the LTE RAT in the tenth sub-frame and in the sub-frames from the first sub-frame to the fourth sub-frame, and that spectrum of the primary-serving cell 202 is allocated to the UMTS RAT in the sub-frames from the fifth sub-frame to the ninth sub-frame. The pattern information may further indicate spectrum allocation information such as which frequency-band is allocated to the current RAT.

In step 304, the pattern information is sent to a UE, e.g., the UE 206. For example, the pattern information is sent to the UE 206 by common signaling such as broadcasting signaling, or by dedicated signaling such as RRC signaling and RACH signaling. In one embodiment, the first pattern information enables the UE 206 to select any sub-frame in the first plurality of sub-frames to measure the downlink CRS sent by the first base station if a RAT pattern of the UE 206 corresponds to the first RAT, or enables the UE 206 to select any sub-frame in the second plurality of sub-frames to measure the downlink CRS sent by the first base station if the RAT pattern of the UE 206 corresponds to the second RAT. For example, if the RAT pattern of the UE 206 is LTE pattern, the first pattern information enables the UE 206 to select the tenth sub-frame or any sub-frame in the sub-frames from the first sub-frame to the fourth sub-frame to measure the downlink CRS sent by the base station 208. If the RAT pattern of the UE 206 is UMTS pattern, the first pattern information enables the UE 206 to select any sub-frame in the sub-frames from the fifth sub-frame to the ninth sub-frame to measure the downlink CRS sent by the base station 208.

Therefore, embodiments of the present invention provide a method of transmitting pattern information in a scenario where spectrum of a cell is allocated to a first RAT and a second RAT in different sub-frames. Advantageously, the first pattern information sent to the UE 206 enables the UE 206 to select any sub-frame in the first plurality of sub-frames to measure the downlink CRS sent by the first base station if the RAT pattern of UE 206 corresponds to the first RAT, or enables the UE 206 to select any sub-frame in the second plurality of sub-frames to measure the downlink CRS sent by the first base station if the RAT pattern of UE 206 corresponds to the second RAT. Therefore, for example, the UE 206 is aware of the pattern information of the primary-serving cell 202, and is able to self-determine when to measure the downlink CRS sent by the base station 208, based on UE 206 own RAT pattern. In this way, the measurement result of downlink CRS such as CQI or RSRP, obtained in a sub-frame corresponding to UE 206's RAT pattern, is correct. According to a correct value of CQI or a correct value of RSRP reported by the UE 206, the base station 208 can correctly provide a modulation and coding scheme (MCS) in a downlink scheduling process. The provided MCS can reflect a real channel quality in UE's environment, thus improving scheduling accuracy and efficiency.

In another embodiment, the pattern information includes the first pattern information and second pattern information of a second cell. The second cell belongs to or is associated with a second base station, e.g., the base station 210. For example, the second pattern information includes pattern information of the adjacent cell 204. The second pattern information indicates that spectrum of the second cell is allocated to a third RAT (e.g., UMTS RAT) in a third plurality of sub-frames, and that spectrum of the first cell is allocated to a fourth RAT (e.g., LTE RAT) in a fourth plurality of sub-frames. In the example of FIG. 2, the pattern information of the adjacent cell 204 indicates that spectrum of the adjacent cell 204 is allocated to the UMTS RAT in the sub-frames from the first sub-frame to the fifth sub-frame and in the sub-frames from the ninth sub-frame to the tenth sub-frame, and that spectrum of the adjacent cell 204 is allocated to the LTE RAT from the sixth sub-frame to the eighth sub-frame.

Similarly, the second pattern information enables the UE 206 to select any sub-frame in the third plurality of sub-frames to measure the downlink CRS sent by the second base station if the RAT pattern of the UE 206 corresponds to the third RAT, or enables the UE 206 to select any sub-frame in the fourth plurality of sub-frames to measure the downlink CRS sent by the second base station if the RAT pattern of the UE 206 corresponds to the fourth RAT. For example, if the RAT pattern of the UE 206 is LTE pattern, the second pattern information enables the UE 206 to select any sub-frame in the sub-frames from the sixth sub-frame to the eighth sub-frame to measure the downlink CRS sent by the base station 210. If the RAT pattern of the UE 206 is UMTS pattern, the second pattern information enables the UE 206 to select any sub-frame in the sub-frames from the first sub-frame to the fifth sub-frame and sub-frames from the ninth sub-frame to the tenth sub-frame to measure the downlink CRS sent by the base station 210.

In one embodiment, the pattern information of the adjacent cell 204 is obtained from the base station 210. The interaction between the base stations 208 and 210 will be further described in relation to FIG. 4A, FIG. 4B, FIG. 4C, and FIG. 4D. In another embodiment, the pattern information of the adjacent cell 204 is obtained from the centralized node 212. The interaction between the base station 208 and the centralized node 212 will be further described in relation to FIG. 5A and FIG. 5B.

In a cell handover procedure, the first base station makes a handover determination according to the measurement result of the CRS in the primary-serving cell (e.g., RSRP of primary-serving cell) and according to the measurement result of the CRS in the adjacent cell (e.g., RSRP of the adjacent cell). Further, the measurement result of the CRS in the primary-serving cell and the measurement result of the CRS in the adjacent cell are generated according to the first pattern information and the second pattern information, respectively. Specifically, the UE 206 measures the channel quality of the primary-serving cell and the channel quality of the adjacent cell. When the measurement results satisfy a certain requirement, the UE 206 actively reports the measurement results to the primary-serving cell, and the first base station accordingly makes a handover determination. More specifically, the UE 206 measures the value of RSRP of the primary-service cell $RSRP_P$ periodically. At the same time, the UE 206 measures the value of RSRP of an adjacent cell $RSRP_A$ periodically. When the values of $RSRP_P$ and $RSRP_A$ satisfy a requirement such as $RSRP_A>RSRP_P+delta$, the UE 206 actively reports the measurement to the primary-serving cell. Advantageously, based on the first pattern information and the second pattern information, the UE 206 is able to self-determine when to measure the downlink CRS sent by the base station 208, and self-determine when to measure the downlink CRS sent by the base station 410. As a result, the measurement result of the CRS such as RSRP in the primary-serving cell 202 and the measurement result of the CRS such as RSRP in the adjacent cell 204 are correct, and correct values of $RSRP_M$ and $RSRP_A$ are utilized in the handover determination, improving accuracy and efficiency for the base station 208 to perform a handover determination.

Optionally, the first pattern information further indicates that spectrum of the first cell is allocated for a cell-edge UE in the first cell in a fifth plurality of sub-frames, and that spectrum of the first cell is allocated a cell-center UE in the first cell in a sixth plurality of sub-frames. The first pattern information further enables the UE 206 to select any sub-frame in the fifth plurality of sub-frames to measure the downlink CRS sent by the first base station if the UE 206 is a cell-edge UE, or enables the UE 206 to select any sub-frame in the sixth plurality of sub-frames to measure the downlink CRS sent by the first base station if the UE 206 is a cell-center UE.

For example, the first pattern information indicates that the spectrum is allocated for a LTE cell-edge UE in the primary-serving cell 202 in the sub-frames from the first sub-frame to the second sub-frame, and that the spectrum is allocated for a LTE cell-center UE in the primary-serving cell 202 in the sub-frames from the third sub-frame to the fourth sub-frame. If the RAT pattern of the UE 206 is LTE pattern and the UE 206 is the cell-edge UE in the primary-serving cell 202, the first pattern information enables the UE 206 to select any sub-frame in the sub-frames from the first sub-frame to the second sub-frame to measure the downlink CRS sent by the base station 208. If the RAT pattern of UE 206 is LTE pattern and the UE 206 is the cell-center UE in the primary-serving cell 202, the first pattern information enables the UE 206 to select any sub-frame in the sub-frames from the third sub-frame to the fourth sub-frame to measure the downlink CRS sent by the base station 208. Therefore, the system throughput in the primary-serving cell 202 is improved.

Optionally, the first pattern information further indicates that spectrum of the first cell is allocated for a UE which is using service of a first service type in the first cell in a seventh plurality of sub-frames, and that spectrum of the first cell is allocated for a UE which is using service of a second service type in the first cell in a eighth plurality of sub-frames. The first pattern information further enables the UE 206 to select any sub-frame in the seventh plurality to measure the downlink CRS sent by the first base station if the UE 206 is using service of a first service type, or enables the UE 206 to select any sub-frame in the eighth plurality of sub-frames to measure the downlink CRS sent by the first base station if the UE 206 is using service of a second service type.

For example, the first pattern information indicates that the spectrum is allocated for a UMTS UE that is making phone calls in the primary-serving cell 202 in the sub-frames from the fifth sub-frame to the seventh sub-frame, and that the spectrum is allocated for a UMTS UE that is watching videos in the primary-serving cell 202 in the sub-frames from the eighth sub-frame to the ninth sub-frame. If the RAT pattern of the UE 206 is UMTS pattern and the UE 206 is making phone calls in the primary-serving cell 202, the UE 206 may select any sub-frame in the sub-frames from the fifth sub-frame to the seventh sub-frame to measure the downlink CRS sent by the base station 208. If the RAT pattern of the UE 206 is UMTS pattern and the UE 206 is watching videos in the primary-serving cell 202, the UE 206 may select any sub-frame in the sub-frames from the eighth sub-frame to the ninth sub-frame to measure the downlink CRS sent by the base station 208. Therefore, the system throughput in the primary-serving cell 202 is improved.

Optionally, the second pattern information further indicates that spectrum of the second cell is allocated for a cell-edge UE in the second cell in a eleventh plurality of sub-frames, and that spectrum of the second cell is allocated a cell-center UE in the second cell in a twelfth plurality of sub-frames. The second pattern information further enables the UE 206 to select any sub-frame in the eleventh plurality of sub-frames to measure the downlink CRS sent by the second base station if the UE 206 is the cell-edge UE, or enables the UE 206 to select any sub-frame in the twelfth plurality of sub-frames to measure the downlink CRS sent by the second base station if the UE 206 is the cell-center UE.

Optionally, the second pattern information further indicates that spectrum of the second cell is allocated for a UE which is using service of a first service type in the second cell in a thirteenth plurality of sub-frames, and that spectrum of the second cell is allocated for a UE which is using service of a second service type in the second cell in a fourteenth plurality of sub-frames. The second pattern information further enables the UE 206 to select any sub-frame in the thirteenth plurality to measure the downlink CRS sent by the second base station if the UE 206 is using service of a first service type, or enables the UE 206 to select any sub-frame in the fourteenth plurality of sub-frames to measure the downlink CRS sent by the second base station if the UE 206 is using service of a second service type.

It should be understood that the invention is not limited to above pattern information, pattern information indicating other spectrum allocation information in a cell is also under the scope of embodiments of the present invention.

FIG. 4A, FIG. 4B, FIG. 4C and FIG. 4D are sequence diagrams that respectively illustrate four examples of interaction between the base station 208 and 210 to obtain the pattern information of the adjacent cell 204, according to one embodiment of the present invention.

In the example of FIG. 4A, in step 402, a pattern request is sent from the base station 208 to the base station 210, which indicates the base station 210 to report pattern information of the adjacent cell 204. For example, multiple report functions can be included in the pattern request. For example, the report functions include the number of reporting and the period of reporting. The pattern request may also request the base station 210 to report the pattern information of the adjacent cell 204 when a certain event is triggered, for example, the event includes switching spectrum in the adjacent cell 204 from one RAT to another RAT.

In step 404, a pattern response including the pattern information of the adjacent cell 204 is received from the base station 210. Thus, the pattern information of the adjacent cell 204 is obtained by the base station 208.

In the example of FIG. 4B, in step 412, a pattern report including the pattern information of the adjacent cell 204, actively reported by the base station 210 to the base station 208, is received. That is, the base station 210 actively reports the pattern information when a certain event is triggered, for example, the event includes switching spectrum in the adjacent cell 204 from one RAT to another RAT. Thus, the pattern information of the adjacent cell 204 is obtained by the base station 208.

In the example of FIG. 4C, in step 422, a pattern request is sent from the base station 208 to the centralized node 212; and in step 424, the pattern request is sent from the centralized node 212 to the base station 210, which requests the base station 210 to report pattern information of the adjacent cell 204. Multiple report functions can be included in the pattern request as mentioned in the step 402.

In step 426, a pattern response including the pattern information of the adjacent cell 204 is received from the base station 210, by the centralized node 212; and in step 428, the pattern response including the pattern information of the adjacent cell 204 is received from the centralized node 212, by the base station 208. Thus, the pattern information of the adjacent cell 204 is obtained by the base station 208.

In the example of FIG. 4D, in step 432, a pattern report including the pattern information of the adjacent cell 204 is actively reported by the base station 210 to the centralized node 212; and in step 434, the pattern information including the pattern information of the adjacent cell 204 is transmitted from the centralized node 212 to the base station 208. Thus, the pattern information of the adjacent cell 204 is obtained by the base station 208.

However, it should be understood that the invention is not so limited; other possible means for obtaining the pattern information of the adjacent cell 204 from a base station is also under the scope of embodiments of the present invention.

FIG. 5A and FIG. 5B are sequence diagrams that respectively illustrate two examples of interaction between the base station 208 and the centralized node 212 to obtain the pattern information of the adjacent cell 204, according to one embodiment of the present invention. In the examples shown in FIG. 5A and FIG. 5B, the pattern information of the adjacent cell 204 is stored in the centralized node 212, which will be further described in relation to FIG. 6.

In the example in FIG. 5A, in step 502, a pattern request is sent from the base station 208 to the centralized node 212, which indicates the centralized node 212 to report stored pattern information of the adjacent cell 204.

In step 504, a pattern response including the pattern information of the adjacent cell 204 is received from the centralized node 212. Thus, the pattern information of the adjacent cell 204 is obtained by the base station 208.

In the example in FIG. 5B, in step 512, a pattern report including the pattern information of the adjacent cell 204, actively reported by the centralized node 212 to the base station 208, is received. For example, the centralized node 212 actively reports the pattern information when a certain event is triggered. Thus, the pattern information of the adjacent cell 204 is obtained by the base station 208.

FIG. 6 illustrates a flowchart of a method for transmitting pattern information, according to one embodiment of the present invention. The flowchart is performed by a centralized node, e.g., the centralized node 212 in a scenario illustrated in FIG. 2. FIG. 6 is described in combination with FIG. 2 to FIG. 5B.

In step 602, third pattern information of a third cell is obtained by the centralized node 212. The third cell includes but not limited to the primary-service cell 202, the adjacent cell 204, or any other cells in which spectrum is allocated to a fifth RAT and a sixth RAT in different sub-frames. The third pattern information indicates that spectrum of the third cell is allocated to the fifth RAT (e.g., UMTS RAT) in a ninth plurality of sub-frames, and that spectrum of the third cell is allocated to the sixth RAT (e.g., LTE RAT) in a tenth plurality of sub-frames. How the pattern information of the third cell is obtained by the centralized node 212 is further described in FIG. 7A and FIG. 7B.

In step 604, the third pattern information of the third cell is stored in the centralized node 212. In one embodiment, the third pattern information of the third cell is further sent to a base station covering a fourth cell. For example, the third pattern information of the third cell is the pattern information of the adjacent cell 204 and base station to which the fourth cell belongs is the base station 208 to which the primary-serving cell 202 belongs. The pattern information of the adjacent cell 204 is sent to the base station 208, according to a request from the base station 208, or by an active reporting performed by the centralized node 212. In another embodiment, according to the stored pattern information of the third cell, the centralized node 212 re-configures the pattern for a fifth cell.

FIG. 7A and FIG. 7B are sequence diagrams that respectively illustrates two examples of interaction between the centralized node 212 and a base station 700 covering the third cell to obtain the third pattern information of the third cell, according to one embodiment of the present invention. In one embodiment, the base station 700 includes but not limited to the base station 208 or the base station 210.

In the example of FIG. 7A, in step 702, a pattern request is sent from the centralized node 212 to the base station 700, which requests the base station 700 to report third pattern information of the third cell.

In step 704, a pattern response including the third pattern information of the third cell is received from the base station 700. Thus, the third pattern information of the third cell is obtained by the centralized node 212.

In the example of FIG. 7B, in step 712, a pattern report including the third pattern information of the third cell is actively reported by the base station 700 to the centralized node 212. For example, the base station 700 actively reports the third pattern information of the third cell when a certain event is triggered. Thus, the third pattern information of the third cell is obtained by the centralized node 212.

Figure 8:
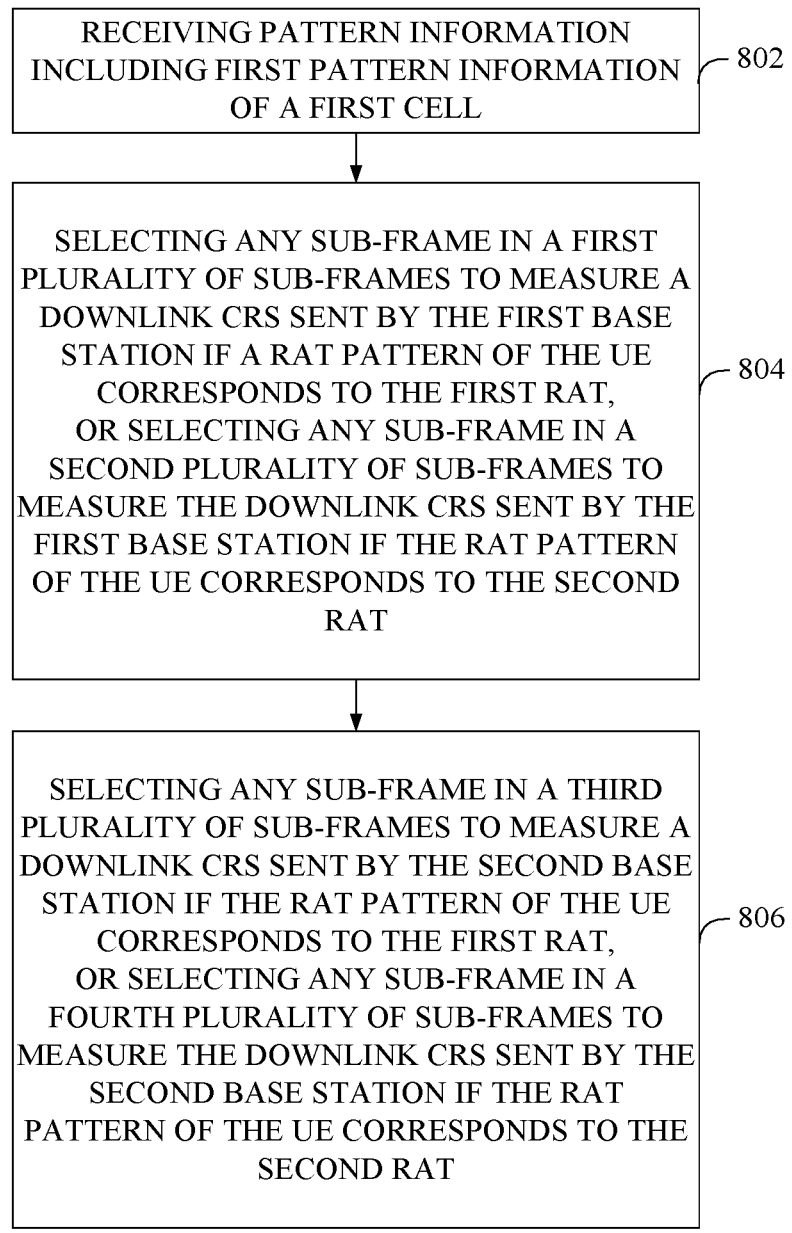
FIG. 8 illustrates a flowchart of a method for transmitting pattern information, performed by UE, according to one embodiment of the present invention.

FIG. 8 illustrates a flowchart of a method for transmitting pattern information, according to one embodiment of the present invention. The flowchart in FIG. 8 is related to the flowchart in FIG. 3, and is performed by UE, e.g., the UE 206 in a scenario illustrated in FIG. 2.

In step 802, the pattern information is received. For example, the pattern information is received from a first base station by common signaling such as broadcasting signaling, or by dedicated signaling such as RRC signaling and RACH signaling.

In one embodiment, the pattern information at least includes first pattern information of a first cell. The first cell belongs to or is associated with the first base station. The first pattern information of the first cell includes pattern information of the primary-serving cell 202. The first pattern information indicates that spectrum of the first cell is allocated to a first RAT (e.g., UMTS RAT) in a first plurality of sub-frames, and that spectrum of the first cell is allocated to a second RAT (e.g., LTE RAT) in a second plurality of sub-frames. In the scenario illustrated in FIG. 2, for example, the pattern information of the primary-serving cell 202 indicates that spectrum of the primary-serving cell 202 is allocated to the LTE RAT in the tenth sub-frame and in the sub-frames from the first sub-frame to the fourth sub-frame, and that spectrum of the primary-serving cell 202 is allocated to the UMTS RAT in the sub-frames from the fifth sub-frame to the ninth sub-frame. The pattern information may further indicate spectrum allocation information such as which frequency-band is allocated to the current RAT.

In step 804, any sub-frame in the first plurality of sub-frames is selected to measure the downlink CRS sent by the first base station if the RAT pattern of the UE 206 corresponds to the first RAT, or, any sub-frame in the second plurality of sub-frames is selected to measure the downlink CRS sent by the first base station if the RAT pattern of UE 206 corresponds to the second RAT. For example, if the RAT pattern of the UE 206 is LTE pattern, the UE 206 may select the tenth sub-frame or any sub-frame in the sub-frames from the first sub-frame to the fourth sub-frame to measure the downlink CRS sent by the base station 208. If the RAT pattern of the UE 206 is UMTS pattern, the UE 206 may select any sub-frame in the sub-frames from the fifth sub-frame to the ninth sub-frame to measure the downlink CRS sent by the base station 208.

Advantageously, since the UE 206 receives the first pattern information, the UE 206 is aware of the pattern information of the primary-serving cell 202, and UE 206 is able to self-determine when to measure downlink data sent by the base station 208. In this way, the measurement result of downlink CRS such as CQI or RSRP, obtained in a sub-frame corresponding to UE 206's RAT pattern, is correct. According to a correct value of CQI or a correct value of RSRP reported by the UE 206, the base station 208 can correctly provide a modulation and coding scheme (MCS) in a downlink scheduling process. The provided MCS can reflect a real channel quality in UE's environment, thus improving scheduling accuracy and efficiency.

In another embodiment, the pattern information includes the first pattern information and second pattern information of a second cell. The second cell belongs to or is associated with a second base station. For example, the second pattern information includes pattern information of the adjacent cell 204. The second pattern information indicates that spectrum of the second cell is allocated to a third RAT (e.g., UMTS RAT) in a third plurality of sub-frames, and that spectrum of the first cell is allocated to a fourth RAT (e.g., LTE RAT) in a fourth plurality of sub-frames. In the example of FIG. 2, the pattern information of the adjacent cell 204 indicates that spectrum of the adjacent cell 204 is allocated to UMTS RAT in the sub-frames from the first sub-frame to the fifth sub-frame and in the sub-frames from the ninth sub-frame to the tenth sub-frame, and that spectrum of the adjacent cell 204 is allocated to LTE RAT from the sixth sub-frame to the eighth sub-frame.

Thus, the method for transmitting pattern information further includes:

In step 806, any sub-frame in the third plurality of sub-frames is selected to measure the downlink CRS sent by the second base station if the RAT pattern of the UE 206 corresponds to the third RAT, or, any sub-frame in the fourth plurality of sub-frames is selected to measure the downlink CRS sent by the second base station if the RAT pattern of UE 206 corresponds to the fourth RAT. For example, if the RAT pattern of the UE 206 is LTE pattern, the UE 206 may select any sub-frame in the sub-frames from the fifth sub-frame to the eighth sub-frame to measure the downlink CRS sent by the base station 210. If the RAT pattern of the UE 206 is UMTS pattern, the UE 206 may select any sub-frame in the sub-frames from the first sub-frame to the fifth sub-frame or any sub-frame in the sub-frames from the ninth sub-frame to the tenth sub-frame to measure the downlink CRS sent by the base station 210.

In a cell handover procedure, the UE measures CRS in the primary-serving cell (e.g., RSRP of primary-service) according to the first pattern information and measures CRS in the adjacent cell (e.g., RSRP of adjacent-service) according to the second pattern information, and provides the measurement results to the first base station for making a handover determination. Advantageously, based on the first pattern information and the second pattern information, the UE 206 is able to self-determine when to measure the downlink CRS sent by the base station 208, and self-determine when to measure the downlink CRS sent by the base station 410. As a result, the measurement result of the CRS such as RSRP in the primary-serving cell 202 and the measurement result of the CRS such as RSRP in the adjacent cell 204 are correct, and correct values of $RSRP_M$ and $RSRP_A$ are utilized in the handover determination, improving accuracy and efficiency for the base station 208 to perform a handover determination.

Optionally, the first pattern information may further indicate that spectrum of the first cell is allocated for a cell-edge UE in the first cell in a fifth plurality of sub-frames, and that spectrum of the first cell is allocated a cell-center UE in the first cell in a sixth plurality of sub-frames. For example, the pattern information further indicates that the spectrum is allocated for a LTE cell-edge UE in the primary-serving cell 202 in the sub-frames from the first sub-frame to the second sub-frame, and that the spectrum is allocated for cell-center a LTE UE in the primary-serving cell 202 in the sub-frames from the third sub-frame to the fourth sub-frame. Therefore, according to the pattern information, any sub-frame in the fifth plurality of sub-frames is selected to measure downlink CRS sent by the first base station if the UE 206 is the cell-edge UE, or, any sub-frame in the sixth plurality of sub-frames is selected to measure downlink CRS sent by the first base station if the UE 206 is the cell-center UE.

For example, if the RAT pattern of the UE 206 is LTE pattern and the UE 206 is the cell-edge UE in the primary-serving cell 202, the UE 206 may select any sub-frame in the sub-frames from the first sub-frame to the second sub-frame to measure the downlink CRS sent by the base station 208. If the RAT pattern of UE 206 is LTE pattern and the UE 206 is the cell-center UE in the primary-serving cell 202, the UE 206 may select any sub-frame in the sub-frames from the third sub-frame to the fourth sub-frame to measure the downlink CRS sent by the base station 208. Therefore, the system throughput in the primary-serving cell 202 is improved.

Optionally, the first pattern information may further indicates that spectrum of the first cell is allocated for a UE which is using service of a first service type in the first cell in a seventh plurality of sub-frames, and that spectrum of the first cell is allocated for a UE which is using service of a second service type in a eighth plurality of sub-frames in the first cell. For example, the pattern information further indicates that the spectrum is allocated for a UMTS UE using service of the first service type (e.g., making phone calls) in the primary-serving cell 202 in the sub-frames from the fifth sub-frame to the seventh sub-frame, and that the spectrum is allocated for a UMTS UE using service of the second service type (e.g., watching videos) in the primary-serving cell 202 in the sub-frames from the eighth sub-frame to the ninth sub-frame. Therefore, according to the received pattern information, any sub-frame in the seventh plurality of sub-frames is selected to measure the downlink CRS sent by the first base station if the UE is using service of the first service type, or, any sub-frame in the eighth plurality of sub-frames is selected to measure the downlink CRS sent by the first base station if the UE is using service of the second service type.

For example, if the RAT pattern of the UE 206 is UMTS pattern and the UE 206 is making phone calls in the primary-serving cell 202, the UE 206 may select any sub-frame in the sub-frames from the fifth sub-frame to the seventh sub-frame to measure the downlink CRS sent by the base station 208. If the RAT pattern of the UE 206 is UMTS pattern and the UE 206 is watching videos in the primary-serving cell 202, the UE 206 may select any sub-frame in the sub-frames from the eighth sub-frame to the ninth sub-frame to measure the downlink CRS sent by the base station 208. Therefore, the system throughput in the primary-serving cell 202 is improved.

Optionally, the second pattern information further indicates that spectrum of the second cell is allocated for a cell-edge UE in the second cell in a eleventh plurality of sub-frames, and that spectrum of the second cell is allocated a cell-center UE in the second cell in a twelfth plurality of sub-frames. Therefore, according to the second pattern information, any sub-frame in the eleventh plurality of sub-frames is selected to measure downlink CRS sent by the second base station if the UE 206 is the cell-edge UE, or, any sub-frame in the twelfth plurality of sub-frames is selected to measure downlink CRS sent by the second base station if the UE 206 is the cell-center UE.

Optionally, the second pattern information further indicates that spectrum of the second cell is allocated for a UE which is using service of a first service type in the second cell in a thirteenth plurality of sub-frames, and that spectrum of the second cell is allocated for a UE which is using service of a second service type in the second cell in a fourteenth plurality of sub-frames. Therefore, according to the received pattern information, any sub-frame in the thirteenth plurality of sub-frames is selected to measure the downlink CRS sent by the second base station if the UE is using service of the first service type, or, any sub-frame in the fourteenth plurality of sub-frames is selected to measure the downlink CRS sent by the second base station if the UE is using service of the second service type.

It should be understood that the pattern information of a cell is not limited to the above description, the pattern information of a cell indicating other spectrum allocation information is also under the scope of embodiments of the present invention. For example, if spectrum of the cell is allocated to first radio access technology (RAT) and second RAT alternately in a frequency-division manner, the pattern information indicates that a first frequency-band of the spectrum of the cell is allocated to the first RAT, and that a second frequency band of the spectrum of the cell is allocated to the second RAT. If spectrum of the cell is allocated to first radio access technology (RAT) and second RAT alternately in a time-frequency-division manner, the pattern information indicates that a first frequency-band of the spectrum of the cell is allocated to the first RAT in a first plurality of sub-frames, and that a second frequency band of the spectrum of the cell is allocated to the second RAT in a second plurality of sub-frames.

Figure 9:
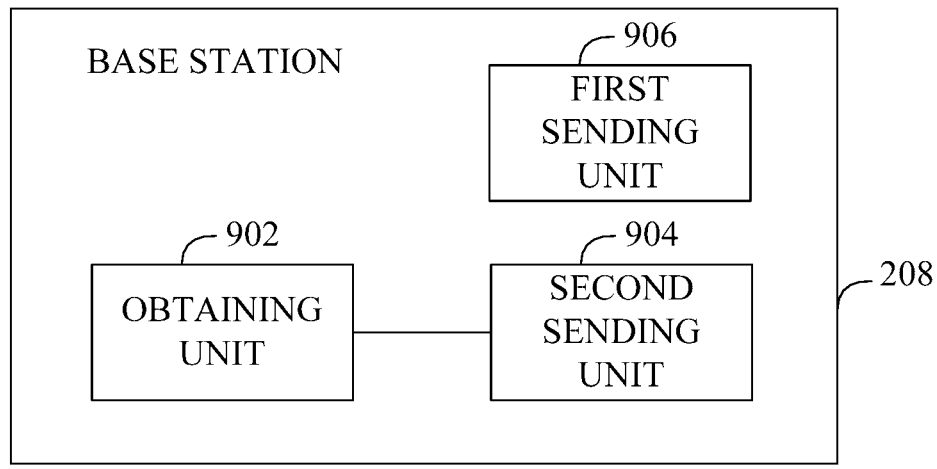
FIG. 9 illustrates a block diagram of a base station for transmitting pattern information, according to one embodiment of the present invention.

FIG. 9 illustrates a block diagram of a base station (e.g., the base station 208) for transmitting pattern information, according to one embodiment of the present invention. FIG. 9 is described in relation to FIG. 2 and FIG. 3. The method for transmitting pattern information as described in FIG. 3 can be implemented by the base station 208.

In one embodiment, the base station 208 includes an obtaining unit 902, a first sending unit 906, and a second sending unit 904. The obtaining unit 902 includes but not limited to a circuitry in the base station 208. The second sending unit 904 is coupled to the obtaining unit 902, and includes but not limited to a transmitter in the base station 208. The first sending unit 906 includes but not limited to the transmitter and is configured to send a downlink CRS. The obtaining unit 902 is configured to obtain pattern information. For example, the circuitry may include a processor for generating the pattern information, or a receiver for receiving the pattern information from a centralized node. In one embodiment, the pattern information at least includes first pattern information of a first cell. For example, the first pattern information includes pattern information of the primary-serving cell 202. The first pattern information indicates that the spectrum of the first cell is allocated to a first RAT (e.g., UMTS RAT) in a first plurality of sub-frames, and that the spectrum of the first cell is allocated to a second RAT (e.g., LTE RAT) in a second plurality of sub-frames. In another embodiment, the pattern information includes the first pattern information and second pattern information of a second cell. For example, the second pattern information includes pattern information of the adjacent cell 204. The second pattern information indicates that the spectrum of the second cell is allocated to a third RAT (e.g., UMTS RAT) in a third plurality of sub-frames, and that the spectrum of the first cell is allocated to a fourth RAT (e.g., LTE RAT) in a fourth plurality of sub-frames. In one embodiment, the obtaining unit 902 establishes interaction with the base station 210 to obtain pattern information of the adjacent cell 204. In another embodiment, the obtaining unit 902 establishes interaction with the centralized node 212 to obtain pattern information of the adjacent cell 204.

In one embodiment, the second sending unit 904 is configured to send the pattern information to a UE, e.g., the UE 206. Specifically, the pattern information is sent to the UE by common signaling such as broadcasting signaling, or by dedicated signaling such as RRC signaling and RACH signaling. In one embodiment, the first cell belongs to or is associated with the first base station. The first pattern information enables the UE to select any sub-frame in the first plurality of sub-frames to measure the downlink CRS sent by the first sending unit 906 if a RAT pattern of the UE 206 corresponds to the first RAT, or enables the UE to select any sub-frame in the second plurality of sub-frames to measure the downlink CRS sent by the first sending unit 906 if the RAT pattern of the UE corresponds to the second RAT. Similarly, the second cell belongs to or is associated with the second base station. The second pattern information enables the UE to select any sub-frame in the third plurality of sub-frames to measure a downlink CRS sent by the second base station if the RAT pattern of the UE corresponds to the third RAT, or enables the UE to select any sub-frame in the fourth plurality of sub-frames to measure the downlink CRS sent by the second base station if the RAT pattern of the UE corresponds to the fourth RAT.

Optionally, the first pattern information further indicates that spectrum of the first cell is allocated for a cell-edge UE in the first cell in a fifth plurality of sub-frames, and that spectrum of the first cell is allocated a cell-center UE in the first cell in a sixth plurality of sub-frames. The first pattern information further enables the UE to select any sub-frame in the fifth plurality of sub-frames to measure the downlink CRS sent by the first base station if the UE is the cell-edge UE, or enables the UE to select any sub-frame in the sixth plurality of sub-frames to measure the downlink CRS sent by the first base station if the UE is the cell-center UE.

Optionally, the first pattern information further indicates that spectrum of the first cell is allocated for a UE which is using service of a first service type in the first cell in a seventh plurality of sub-frames, and that spectrum of the first cell is allocated for a UE which is using service of a second service type in the first cell in a eighth plurality of sub-frames. The first pattern information further enables the UE to select any sub-frame in the seventh plurality to measure the downlink CRS sent by the first base station if the UE is using service of a first service type, or enables the UE to select any sub-frame in the eighth plurality of sub-frames to measure the downlink CRS sent by the first base station if the UE is using service of a second service type.

Optionally, the second pattern information further indicates that spectrum of the second cell is allocated for a cell-edge UE in the second cell in a eleventh plurality of sub-frames, and that spectrum of the second cell is allocated a cell-center UE in the second cell in a twelfth plurality of sub-frames. The second pattern information further enables the UE to select any sub-frame in the eleventh plurality of sub-frames to measure the downlink CRS sent by the second base station if the UE is the cell-edge UE, or enables the UE to select any sub-frame in the twelfth plurality of sub-frames to measure the downlink CRS sent by the second base station if the UE is the cell-center UE.

Optionally, the second pattern information further indicates that spectrum of the second cell is allocated for a UE which is using service of a first service type in the second cell in a thirteenth plurality of sub-frames, and that spectrum of the second cell is allocated for a UE which is using service of a second service type in the second cell in a fourteenth plurality of sub-frames. The second pattern information further enables the UE to select any sub-frame in the thirteenth plurality to measure the downlink CRS sent by the second base station if the UE is using service of a first service type, or enables the UE to select any sub-frame in the fourteenth plurality of sub-frames to measure the downlink CRS sent by the second base station if the UE is using service of a second service type.

Figure 10:
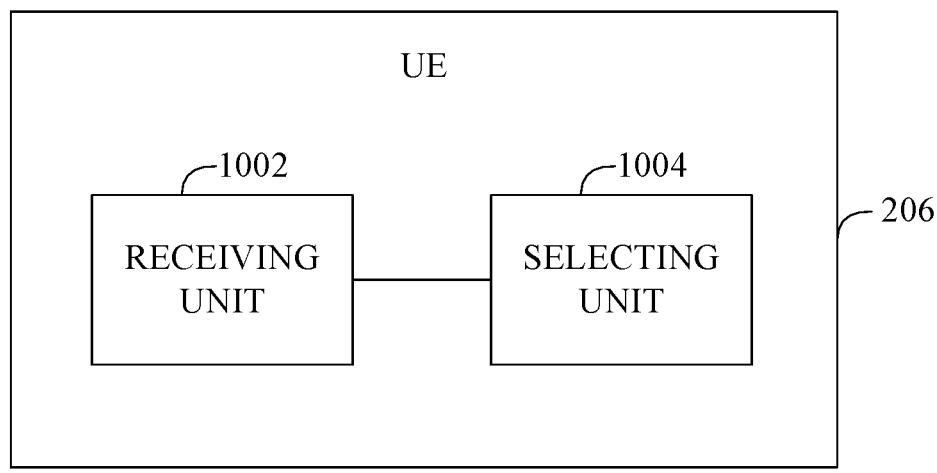
FIG. 10 illustrates a block diagram of a UE for transmitting pattern information, according to one embodiment of the present invention.

FIG. 10 illustrates a block diagram of a UE (e.g., the UE 206) for transmitting pattern information, according to one embodiment of the present invention. FIG. 10 is described in relation to FIG. 2 and FIG. 8. The method for transmitting pattern information as described in FIG. 8 can be implemented by the UE 206.

In one embodiment, the UE 206 includes a receiving unit 1002 and a selecting unit 1004. The receiving unit 1002 includes but not limited to a receiver. The selecting unit 1004 is coupled to the receiving unit 1002, and includes but not limited to a processor. The receiving unit 1002 is configured to receive pattern information from a first base station. Specifically, the pattern information is received from the first base station by common signaling such as broadcasting signaling, or by dedicated signaling such as RRC signaling and RACH signaling. In one embodiment, the pattern information at least includes first pattern information of a first cell. The first cell belongs to or is associated with the first base station. For example, the first pattern information of the first cell includes pattern information of the primary-serving cell 202. The first pattern information indicates that the spectrum of the first cell is allocated to a first RAT (e.g., UMTS RAT) in a first plurality of sub-frames, and that the spectrum of the first cell is allocated to a second RAT (e.g., LTE RAT) in a second plurality of sub-frames.

In one embodiment, the selecting unit 1004 selects any sub-frame in the first plurality of sub-frames to measure the downlink CRS sent by the first base station if a RAT pattern of the UE 206 corresponds to the first RAT, or, selects any sub-frame in the second plurality of sub-frames to measure the downlink CRS sent by the first base station if the RAT pattern of UE 206 corresponds to the second RAT.

In another embodiment, the pattern information includes the first pattern information and second pattern information of a second cell. The second cell belongs to or is associated with a second base station. For example, the second pattern information includes pattern information of the adjacent cell 204. The second pattern information indicates that the spectrum of the second cell is allocated to a third RAT (e.g., UMTS RAT) in a third plurality of sub-frames, and that the spectrum of the first cell is allocated to a fourth RAT (e.g., LTE RAT) in a fourth plurality of sub-frames.

In this case, the selecting unit 1004 further selects any sub-frame in the third plurality of sub-frames to measure the downlink CRS sent by the second base station if the RAT pattern of the UE 206 corresponds to the third RAT, or, selects any sub-frame in the fourth plurality of sub-frames to measure the downlink CRS sent by the second base station if the RAT pattern of UE 206 corresponds to the fourth RAT.

Optionally, the first pattern information may further indicate that spectrum of the first cell is allocated for a cell-edge UE in the first cell in a fifth plurality of sub-frames, and that spectrum of the first cell is allocated a cell-center UE in the first cell in a sixth plurality of sub-frames. Therefore, according to the first pattern information, the selecting unit 1004 selects any sub-frame in the fifth plurality of sub-frames to measure downlink CRS sent by the first base station if the UE 206 is the cell-edge UE, or, the selecting unit 1004 selects any sub-frame in the sixth plurality of sub-frames to measure downlink CRS sent by the first base station if the UE 206 is the cell-center UE.

Optionally, the first pattern information further indicates that spectrum of the first cell is allocated for a UE which is using service of a first service type in the first cell in a seventh plurality of sub-frames, and that spectrum of the first cell is allocated for a UE which is using service of a second service type in the first cell in a eighth plurality of sub-frames. Therefore, according to the received pattern information, the selecting unit 1004 selects any sub-frame in the seventh plurality of sub-frames to measure the downlink CRS sent by the first base station if the UE is using service of the first service type, or, the selecting unit 1004 selects any sub-frame in the eighth plurality of sub-frames to measure the downlink CRS sent by the first base station if the UE is using service of the second service type.

Optionally, the second pattern information further indicates that spectrum of the second cell is allocated for a cell-edge UE in the second cell in a eleventh plurality of sub-frames, and that spectrum of the second cell is allocated a cell-center UE in the second cell in a twelfth plurality of sub-frames. Therefore, according to the second pattern information, the selecting unit 1004 selects any sub-frame in the eleventh plurality of sub-frames to measure downlink CRS sent by the second base station if the UE 206 is the cell-edge UE, or, the selecting unit 1004 selects any sub-frame in the twelfth plurality of sub-frames to measure downlink CRS sent by the second base station if the UE 206 is the cell-center UE.

Optionally, the second pattern information further indicates that spectrum of the second cell is allocated for a UE which is using service of a first service type in the second cell in a thirteenth plurality of sub-frames, and that spectrum of the second cell is allocated for a UE which is using service of a second service type in the second cell in a fourteenth plurality of sub-frames. Therefore, according to the received pattern information, the selecting unit 1004 selects any sub-frame in the thirteenth plurality of sub-frames to measure the downlink CRS sent by the second base station if the UE is using service of the first service type, or, the selecting unit 1004 selects any sub-frame in the fourteenth plurality of sub-frames to measure the downlink CRS sent by the second base station if the UE is using service of the second service type.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of embodiments of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. A part of or all of the units may be selected according to actual needs to achieve the objectives of the solutions of the embodiments.

In addition, functional units in the embodiments of the present invention may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of embodiments of the present invention essentially, or the part contributing to the prior art, or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of embodiments of the present invention, but are not intended to limit the protection scope of embodiments of the present invention. Any variation or replacement readily figured out by a person skilled in the art within the technical scope disclosed in embodiments of the present invention shall fall within the protection scope of embodiments of the present invention. Therefore, the protection scope of embodiments of the present invention shall be subject to the protection scope of the claims.

What is claimed is:

1. A method, comprising:
   receiving, by a user equipment (UE), pattern information comprising first pattern information of a first cell, wherein the first cell belongs to a first base station, wherein spectrum of the first cell is allocated to a first radio access technology (RAT) and a second RAT in different sub-frames, wherein the first pattern information indicates that spectrum of the first cell is allocated to the first RAT in a first plurality of sub-frames and that spectrum of the first cell is allocated to the second RAT in a second plurality of sub-frames, wherein the first pattern information further indicates that spectrum of the first cell is allocated for a UE which is using service of a first service type in the first cell in a third plurality of sub-frames, and that spectrum of the first cell is allocated for a UE which is using service of a second service type in the first cell in a fourth plurality of sub-frames;

selecting any sub-frame in the first plurality of sub-frames to measure a downlink cell reference signal (CRS) sent by the first base station in response to a RAT pattern of the UE corresponding to the first RAT;

selecting any sub-frame in the second plurality of sub-frames to measure the downlink CRS sent by the first base station in response to the RAT pattern of the UE corresponding to the second RAT;

selecting any sub-frame in the third plurality of sub-frames to measure the downlink CRS sent by the first base station in response to determining that the UE is using service of the first service type; and selecting any sub-frame in the fourth plurality of sub-frames to measure the downlink CRS sent by the first base station in response to determining that the UE is using service of the second service type.

2. The method as claimed in claim 1, wherein the first pattern information comprises pattern information of a primary-serving cell.

3. The method as claimed in claim 1, wherein the pattern information further comprises second pattern information of a second cell, wherein the second cell belongs to a second base station, wherein spectrum of the second cell is allocated to a third RAT and a fourth RAT in different sub-frames, wherein the second pattern information indicates that spectrum of the second cell is allocated to the third RAT in a fifth plurality of sub-frames and that spectrum of the second cell is allocated to the fourth RAT in a sixth plurality of sub-frames;

wherein the method further comprises:
selecting any sub-frame in the fifth plurality of sub-frames to measure a CRS sent by the second base station in response to the RAT pattern of the UE corresponding to the third RAT; and selecting any sub-frame in the sixth plurality of sub-frames to measure the downlink CRS sent by the second base station in response to the RAT pattern of the UE corresponding to the fourth RAT.

4. The method as claimed in claim 3, wherein the second pattern information of the second cell comprises pattern information of an adjacent cell.

5. The method as claimed in claim 1, wherein the first pattern information further indicates that spectrum of the first cell is allocated for a cell-edge UE in the first cell in a seventh plurality of sub-frames, and that spectrum of the first cell is allocated a cell-center UE in the first cell in an eighth plurality of sub-frames;

wherein the method further comprises:
selecting any sub-frame in the seventh plurality of sub-frames to measure the downlink CRS sent by the first base station in response to determining that the UE is the cell-edge UE; and selecting any sub-frame in the eighth plurality of sub-frames to measure the downlink CRS sent by the first base station in response to determining that the UE is the cell-center UE.

6. An apparatus, comprising:
a receiver, the receiver configured to receive pattern information comprising first pattern information of a primary-serving cell, wherein the primary-serving cell belongs to a first base station, wherein spectrum of the primary-serving cell is allocated to a first radio access technology (RAT) and a second RAT in different sub-frames, wherein the first pattern information indicates that spectrum of the primary-serving cell is allocated to the first RAT in a first plurality of sub-frames and that spectrum of the primary-serving cell is allocated to the second RAT in a second plurality of sub-frames, wherein the first pattern information further indicates that spectrum of the primary-serving cell is allocated for a UE which is using service of a first service type in the primary-serving cell in a third plurality of sub-frames and that spectrum of the primary-serving cell is allocated for a UE which is using service of a second service type in the primary-serving cell in a fourth plurality of sub-frames; and at least one processor, the at least one processor coupled to the receiver and configured to:
select any sub-frame in the first plurality of sub-frames to measure a downlink cell reference signal (CRS) sent by the first base station in response to a RAT pattern of the UE corresponding to the first RAT;

select any sub-frame in the second plurality of sub-frames to measure the downlink CRS sent by the first base station in response to the RAT pattern of the UE corresponding to the second RAT;

select any sub-frame in the third plurality to measure the downlink CRS sent by the first base station in response to determining that the UE is using service of the first service type; and select any sub-frame in the fourth plurality of sub-frames to measure the downlink CRS sent by the first base station in response to determining that the UE is using service of the second service type.

7. The apparatus as claimed in claim 6, wherein the first pattern information comprises pattern information of a primary-serving cell.

8. The apparatus as claimed in claim 6, wherein the pattern information further comprises second pattern information of a second cell, wherein the second cell belongs to a second base station, wherein spectrum of the second cell is allocated to a third RAT and a fourth RAT in different sub-frames, wherein the second pattern information indicates that the spectrum of the second cell is allocated to the third RAT in a fifth plurality of sub-frames and that the spectrum of the second cell is allocated to the fourth RAT in a sixth plurality of sub-frames;

wherein the at least one processor is further configured to:
select any sub-frame in the fifth plurality of sub-frames to measure a downlink CRS sent by the second base station in response to the RAT pattern of the UE corresponding to the third RAT; and select any sub-frame in the sixth plurality of sub-frames to measure the downlink CRS sent by the second base station in response to the RAT pattern of the UE corresponding to the fourth RAT.

9. The apparatus as claimed in claim 8, wherein the second pattern information of the second cell comprises pattern information of an adjacent cell.

10. The apparatus as claimed in claim 6, wherein the first pattern information further indicates that spectrum of the primary-serving cell is allocated for a cell-edge UE in the primary-serving cell in a seventh plurality of sub-frames, and that spectrum of the primary-serving cell is allocated a cell-center UE in the primary-serving cell in an eighth plurality of sub-frames,
   wherein the at least one processor is further configured to:
      select any sub-frame in the seventh plurality of sub-frames to measure the downlink CRS sent by the first base station in response to determining that the UE is the cell-edge UE; and
      select any sub-frame in the eighth plurality of sub-frames to measure the downlink CRS sent by the first base station in response to determining that the UE is the cell-center UE.

11. A non-transitory computer-readable media storing computer instructions for execution by one or more processors, wherein the computer instructions instruct the one or more processors to perform operations of:
   receiving pattern information comprising first pattern information of a first cell, wherein the first cell belongs to a first base station, wherein spectrum of the first cell is allocated to a first radio access technology (RAT) and a second RAT in different sub-frames, wherein the first pattern information indicates that spectrum of the first cell is allocated to the first RAT in a first plurality of sub-frames and that spectrum of the first cell is allocated to the second RAT in a second plurality of sub-frames, wherein the first pattern information further indicates that spectrum of the first cell is allocated for a UE which is using service of a first service type in the first cell in a third plurality of sub-frames and that spectrum of the first cell is allocated for a UE which is using service of a second service type in the first cell in a fourth plurality of sub-frames;
   selecting any sub-frame in the first plurality of sub-frames to measure a downlink cell reference signal (CRS) sent by the first base station in response to a RAT pattern of a user equipment (UE) corresponding to the first RAT;
   selecting any sub-frame in the second plurality of sub-frames to measure the downlink CRS sent by the first base station in response to the RAT pattern of the UE corresponding to the second RAT;
   selecting any sub-frame in the third plurality of sub-frames to measure the downlink CRS sent by the first base station in response to determining that the UE is using service of the first service type, and
   selecting any sub-frame in the fourth plurality of sub-frames to measure the downlink CRS sent by the first base station in response to determining that the UE is using service of the second service type.

12. The non-transitory computer-readable media as claimed in claim 11, wherein the first pattern information of the first cell comprises pattern information of a primary-serving cell.

13. The non-transitory computer-readable media as claimed in claim 11, wherein
   the pattern information further comprises second pattern information of a second cell, wherein the second cell belongs to a second base station, wherein spectrum of the second cell is allocated to a third RAT and a fourth RAT in different sub-frames, wherein the second pattern information indicates that spectrum of the second cell is allocated to the third RAT in a fifth plurality of sub-frames and that spectrum of the second cell is allocated to the fourth RAT in a sixth plurality of sub-frames;
   wherein the computer instructions further instruct the one or more processors to perform the operations of:
      selecting any sub-frame in the fifth plurality of sub-frames to measure a CRS sent by the second base station in response to the RAT pattern of the UE corresponding to the third RAT; and
      selecting any sub-frame in the sixth plurality of sub-frames to measure the downlink CRS sent by the second base station in response to the RAT pattern of the UE corresponding to the fourth RAT.

14. The non-transitory computer-readable media as claimed in claim 13, wherein the second pattern information of the second cell comprises pattern information of an adjacent cell.

15. The non-transitory computer-readable media as claimed in claim 11, wherein
   wherein the first pattern information further indicates that spectrum of the first cell is allocated for a cell-edge UE in the first cell in a seventh plurality of sub-frames, and that spectrum of the first cell is allocated a cell-center UE in the first cell in an eighth plurality of sub-frames;
   wherein the computer instructions further instruct the one or more processors to perform the operations of:
   selecting any sub-frame in the seventh plurality of sub-frames to measure the downlink CRS sent by the first base station in response to determining that the UE is the cell-edge UE; and
   selecting any sub-frame in the eighth plurality of sub-frames to measure the downlink CRS sent by the first base station in response to determining that the UE is the cell-center UE.

* * * * *